(12) United States Patent
Rüger et al.

(10) Patent No.: US 7,264,670 B2
(45) Date of Patent: Sep. 4, 2007

(54) COLOURED MICROSTRUCTURED EFFECT PIGMENTS

(75) Inventors: Reinhold Rüger, Rödermark (DE); Kersten Dittmar, Münster (DE); Johann Dietz, Dietzenbach (DE); Ralf Tischer, Mannheim (DE)

(73) Assignee: Merck Patent Gesellschaft, Darmstadt (DE)

( * ) Notice: Subject to any disclaimer, the term of this patent is extended or adjusted under 35 U.S.C. 154(b) by 315 days.

(21) Appl. No.: 11/007,356

(22) Filed: Dec. 9, 2004

(65) Prior Publication Data
US 2005/0120917 A1    Jun. 9, 2005

(30) Foreign Application Priority Data
Dec. 9, 2003    (DE)   ............................... 103 57 703

(51) Int. Cl.
*C09C 1/62*    (2006.01)

(52) U.S. Cl. ...................................... 106/404; 106/415

(58) Field of Classification Search ................ 106/404; 428/167, 403, 357, 353, 400, 372, 402
See application file for complete search history.

(56) References Cited

U.S. PATENT DOCUMENTS

| 6,630,018 | B2 * | 10/2003 | Bauer et al. ................ 106/415 |
| 6,841,238 | B2 | 1/2005 | Argoitia et al. |
| 6,902,807 | B1 * | 6/2005 | Argoitia et al. ............. 428/403 |
| 2003/0104206 | A1 * | 6/2003 | Argoitia et al. ............. 428/404 |

FOREIGN PATENT DOCUMENTS

| WO | WO93/08237 | 4/1993 |
| WO | WO 03/053674 A1 | 7/2003 |
| WO | WO 03/074614 A1 | 9/2003 |

* cited by examiner

*Primary Examiner*—J. A. Lorengo
*Assistant Examiner*—Pegah Parvini
(74) *Attorney, Agent, or Firm*—Millen, White, Zelano & Branigan, P.C.

(57) ABSTRACT

Disclosed are colored flake-form effect pigments comprising one or more layers, where at least one of the layers comprises one or more colorants or is itself a colorant and at least one of the layers has a groove or grid structure, and to processes for the preparation thereof, and to the use thereof.

28 Claims, No Drawings

COLOURED MICROSTRUCTURED EFFECT PIGMENTS

The invention relates to coloured flake-form effect pigments comprising one or more layers, where at least one of the layers comprises one or more colorants or is itself a colorant and at least one of the layers has a groove or grid structure, to processes for the preparation thereof, and to the use thereof.

The achievement of angle-dependent optical effects in the coating of two-dimensional materials with thin layers has been known for some time. The prerequisite for this is a difference in the refractive indices of the thin layers compared with those of the surrounding media. In physical terms, partial reflection occurs on incidence of light at the phase boundaries. If the thicknesses of the layers are in the order of magnitude of the wavelength of light, the light components reflected at the phase boundaries interfere, and extinction or reinforcement of certain wavelength regions occurs in white light. This results in coloured light, whose colour depends on the viewing angle. Suitable two-dimensional materials are films, foils, but also flakes, which may be coated with the materials of different refractive index. An overview of the principles of angle-dependent optical effects is given in G. Pfaff, P. Reynders, Chem. Rev., 1999, 99, 1963-1981.

Angle-dependent optical effects can alternatively also be produced via grid structures, where the grid constant is preferably in the order of magnitude of from half the wavelength of light to three times the wavelength of light. The said grids can be the three-dimensional regular arrangement of spheres or cavities of equal size, a structural feature, as occurs, for example, in the opals known from nature. Such bodies exhibit discreet to intense interference colours, provided that they are transparent to light. U.S. Pat. No. 6,261,469 describes the production of periodic structures of this type, with the structural feature being regarded as similar to natural opals. The above-mentioned products are not suitable for use in surface coatings and printing inks since multilayered grids are necessary for the occurrence of the interference colour and as a consequence particles of this type are too large for these applications.

Analogous effects can also be achieved by films having a structured surface, with the grid structures again being regular and in the order of magnitude of from half to three times the wavelength of light. The films usually comprise a highly reflective metal layer, which is essential for the occurrence of the powerful diffractive effect. The structures are usually embossed, with the film either being embossed itself or a thermoplastic coating being embossed, if necessary after warming. The area of application of these films is principally in decorative applications, such as, for example, for gift films.

U.S. Pat. No. 5,464,690 describes composite materials comprising a film and a coating, where a diffraction pattern or holographic image is embossed on the coating. The coating and thus the optical element can be transferred to another substrate by heat sealing.

However, direct use of the films or the transfer of optical layers by heat sealing is only of limited applicability. The methods are not suitable for relatively large or highly curved surfaces, nor for the production of paints and surface coatings.

WO 03/053674 describes non-coloured pigments and films having a diffraction grating and at least one reflector layer, where the reflector layer can be a metal layer or the phase boundary between two layers of different refractive index.

Diffractive pigments in accordance with the prior art exhibit, on suitable application in paint coats or printing inks, highly angle-dependent colours which run through the entire spectrum on tilting (rainbow effect). This rainbow effect is particularly pronounced on illumination with directional light, for example by the sun or a (punctiform) emitter. In the case of diffuse illumination, the effect becomes weaker, but is still detectable as such. This effect alone is not sufficient for demanding security features since the appearance is too non-specific and can easily be copied. Known diffractive pigments are therefore of only limited use for the production of security features.

There is therefore an urgent demand for coloured effect pigments which combine an angle-dependent colour with readily and clearly detectable optical effects and in addition exhibit great variability with respect to the colours that can be achieved. In addition, the pigments should be thermally stable and chemically inert. The invention therefore has the object of finding pigments which produce a rainbow effect under directional light, exhibit a characteristic inherent colour under diffuse light and/or are luminescent under suitable illumination, for example under UV light.

Surprisingly, it has been found that the coloured flake-form effect pigments according to the invention satisfy the complex requirement profile mentioned above. The invention therefore relates to coloured flake-form effect pigments comprising one or more layers, where at least one of the layers comprises one or more colorants or is itself a colorant and at least one of the layers has a groove or grid structure.

For the purposes of the present invention, "coloured" is taken to mean that the effect pigments according to the invention have a mass tone or background colour or exhibit luminescence on irradiation with light of suitable wavelengths. Accordingly, the term "colourless" is taken to mean the absence of any mass tone or background colour or luminescence.

Due to the inherent coloration, the effect pigments according to the invention exhibit a broad spectrum of colours and the lustre known of pearlescent pigments and at the same time exhibit a discreet colour play when viewed under directional light. In addition, the pigments are thermally and chemically stable. Owing to the multifarious possibilities in the inherent coloration of the effect pigments according to the invention, they are particularly suitable for use in mixtures with other pigments and facilitate a wide variety of colour compositions having a series of colour shades at changing viewing angle. Pigments of this type exhibit non-copyable colour effects which are highly dependent on the illumination and are therefore particularly suitable for-the production of security features for banknotes, securities or other articles having high forgery security. In addition, the pigments are also of particular interest for decorative applications in printing, surface coatings or in cosmetics. Novel colour effects can be achieved in the case of multilayered effect pigments through combination of the structure-induced colour effects with interference phenomena.

In the effect pigments according to the invention, the particular colour effects are caused firstly by the groove or grid structure of the effect pigments according to the invention. Secondly, the choice of colorant likewise exerts a major influence on the colouring of the pigments with respect to the background colour, mass tone or luminescence colour.

The simplest embodiment of the effect pigments according to the invention comprises a substrate layer which comprises one or more colorants or is itself a colorant and has a groove or grid structure. The substrate layer here can consist, inter alia, of metal oxides, metal oxide hydrates, metal suboxides, metal fluorides, metal nitrides, metal oxynitrides, metal phosphates or mixtures of these materials. The metal oxide, metal oxide hydrate, metal suboxide, metal fluoride, metal nitride, metal oxynitride or metal phosphate layers or the mixtures thereof can be of low refractive index (refractive index <1.8) or high refractive index (refractive index $\geq 1.8$). Suitable metal oxides and metal oxide hydrates are all metal oxides or metal oxide hydrates known to the person skilled in the art, such as, for example, silicon oxide, silicon oxide hydrate, iron oxide, tin oxide, cerium oxide, zinc oxide, chromium oxide, titanium oxide, in particular silicon dioxide, aluminium oxide, titanium dioxide, titanium oxide hydrate, and mixtures thereof, such as, for example, ilmenite or pseudobrookite. Metal suboxides which can be employed are, for example, the titanium sub-oxides. In the case of iron oxide, chromium oxide or titanium suboxides, the layer of this material is itself the colorant. A suitable metal fluoride is, for example, magnesium fluoride. Metal nitrides or metal oxynitrides which can be employed are, for example, the nitrides or oxynitrides of the metals titanium, zirconium and/or tantalum. Preferably metal oxides, metal fluorides and/or metal oxide hydrates and very particularly preferably metal oxides and/or metal oxide hydrates are employed as material for the substrate layer. Particularly suitable for this purpose are aluminium oxide, titanium dioxide, titanium suboxide, titanium oxynitride, silicon dioxide, zirconium oxide, iron oxide, ilmenite, pseudobrookite, chromium oxide, cobalt oxide and/or vanadium oxide.

In this embodiment of the present invention, the substrate layer itself preferably consists of a colorant, in particular of metal oxides and metal suboxides, such as, for example, iron oxides, chromium oxide, cobalt oxide, titanium suboxides or mixtures thereof (for example ilmenite or pseudobrookite).

An essential constituent of the coloured effect pigments are the colorants, where the individual layers of the effect pigments may themselves consist of the colorant. The one or more colorants are selected from the group consisting of inorganic or organic dyes and/or pigments or luminescent colorants.

Suitable inorganic pigments are, for example, black pigments, such as, for example, magnetite or pigment black, and also coloured pigments, such as, for example, iron oxide, chromium oxide, cobalt oxide, mixed-phase oxides, such as, for example, $(Ti, Cr, Sb)O_2$, $CoAl_2O_4$ (Thenard's Blue), $ZnAl_2O_4$ (Rinman's Green), $(Fe, Cr)_2O_3$, furthermore sulfides, such as, for example, CdS, and other inorganic coloured pigments. Coloured metal sols, such as, for example, gold or silver sols, are furthermore suitable as colorant.

Suitable organic pigments are azo pigments, anthraquinone pigments, indigo or thioindigo derivatives, diketo-pyrrolo-pyrrole pigments, perylene pigments or phthalocyanine pigments. Advantageous dyes are, for example, carmine, Berlin Blue, Chromium Oxide Green and/or Manganese Violet. It is particularly advantageous to select the dyes and/or pigments from the following list. The Colour Index numbers (CINs) are taken from the Rowe Colour Index, 3rd Edition, Society of Dyers and Colourists, Bradford, England, 1971.

| Chemical or other name | CIN | Colour |
|---|---|---|
| Pigment Green | 10006 | green |
| Acid Green 1 | 10020 | green |
| 2,4-Dinitrohydroxynaphthalene-7-sulfonic acid | 10316 | yellow |
| Pigment Yellow 1 | 11680 | yellow |
| Pigment Yellow 3 | 11710 | yellow |
| Pigment Orange 1 | 11725 | orange |
| 2,4-Dihydroxyazobenzene | 11920 | orange |
| Solvent Red 3 | 12010 | red |
| 1-(2'-Chloro-4'-nitro-1'-phenylazo)-2-hydroxynaphthalene | 12085 | red |
| Pigment Red 3 | 12120 | red |
| Ceres Red; Sudan Red; Fat Red G | 12150 | red |
| Pigment Red 112 | 12370 | red |
| Pigment Red 7 | 12420 | red |
| Pigment Brown 1 | 12480 | brown |
| N-(5-chloro-2,4-dimethoxyphenyl)-4-[[5-[(diethylamino)-sulfonyl]-2-methoxyphenyl]azo]-3-hydroxynaphthalene-2-carboxamide | 12490 | red |
| Disperse Yellow 16 | 12700 | yellow |
| 1-(4-Sulfo-1-phenylazo)-4-aminobenzene-5-sulfonic acid | 13015 | yellow |
| 2,4-Dihydroxy-azobenzene-4'-sulfonic acid | 14270 | orange |
| 2-(2,4-Dimethylphenylazo-5-sulfonyl)-1-hydroxynaphthalene-4-sulfonic acid | 14700 | red |
| 2-(4-Sulfo-1-naphthylazo)-1-naphthol-4-sulfonic acid | 14720 | red |
| 2-(6-Sulfo-2,4-xylylazo)-1-naphthol-5-sulfonic acid | 14815 | red |
| 1-(4'-Sulfophenylazo)-2-hydroxynaphthalene | 15510 | orange |
| 1-(2-Sulfonyl-4-chloro-5-carboxy-1-phenylazo)-2-hydroxynaphthalene | 15525 | red |
| 1-(3-Methylphenylazo-4-sulfonyl)-2-hydroxynaphthalene | 15580 | red |
| 1-(4',(8')-Sulfonylnaphthylazo)-2-hydroxynaphthalene | 15620 | red |
| 2-Hydroxy-1,2'-azonaphthalene-1'-sulfonic acid | 15630 | red |
| 3-Hydroxy-4-phenylazo-2-naphthylcarboxylic acid | 15800 | red |
| 1-(2-Sulfo-4-methyl-1-phenylazo)-2-naphthylcarboxylic acid | 15850 | red |
| 1-(2-Sulfo-4-methyl-5-chloro-1-phenylazo)-2-hydroxynaphthalene-3-carboxylic acid | 15865 | red |
| 1-(2-Sulfo-1-naphthylazo)-2-hydroxynaphthalene-3-carboxylic acid | 15880 | red |
| 1-(3-Sulfo-1-phenylazo)-2-naphthol-6-sulfonic acid | 15980 | orange |
| 1-(4-Sulfo-1-phenylazo)-2-naphthol-6-sulfonic acid | 15985 | yellow |

-continued

| Chemical or other name | CIN | Colour |
|---|---|---|
| Allura Red | 16035 | red |
| 1-(4-Sulfo-1-naphthylazo)-2-naphthol-3,6-disulfonic acid | 16185 | red |
| Acid Orange 10 | 16230 | orange |
| 1-(4-Sulfo-1-naphthylazo)-2-naphthol-6,8-disulfonic acid | 16255 | red |
| 1-(4-Sulfo-1-naphthylazo)-2-naphthol-3,6,8-trisulfonic acid | 16290 | red |
| 8-Amino-2-phenylazo-1-naphthol-3,6-disulfonic acid | 17200 | red |
| Acid Red 1 | 18050 | red |
| Acid Red 155 | 18130 | red |
| Acid Yellow 121 | 18690 | yellow |
| Acid Red 180 | 18736 | red |
| Acid Yellow 11 | 18820 | yellow |
| Acid Yellow 17 | 18965 | yellow |
| 4-(4-Sulfo-1-phenylazo)-1-(4-sulfophenyl)-5-hydroxy-pyrazolone-3-carboxylic acid | 19140 | yellow |
| Pigment Yellow 16 | 20040 | yellow |
| 2,6-(4'-Sulfo-2'',4''-dimethyl)bisphenylazo)-1,3-dihydroxybenzene | 20170 | orange |
| Acid Black 1 | 20470 | black |
| Pigment Yellow 13 | 21100 | yellow |
| Pigment Yellow 83 | 21108 | yellow |
| Solvent Yellow | 21230 | yellow |
| Acid Red 163 | 24790 | red |
| Acid Red 73 | 27290 | red |
| 2-[4'-(4''-Sulfo-1''-phenylazo)-7'-sulfo-1'-naphthylazo]-1-hydroxy-7-aminonaphthalene-3,6-disulfonic acid | 27755 | black |
| 4-[4''-(Sulfo-1''-phenylazo)-7'-sulfo-1'-naphthylazo]-1-hydroxy-8-acetylaminonaphthalene-3,5-disulfonic acid | 28440 | black |
| Direct Orange 34, 39, 44, 46, 60 | 40215 | orange |
| Food Yellow | 40800 | orange |
| trans-β-Apo-8'-carotene aldehyde (C$_{30}$) | 40820 | orange |
| trans-Apo-8'-carotinic acid (C$_{30}$) ethyl ester | 40850 | orange |
| Canthaxanthine | 40850 | orange |
| Acid Blue 1 | 42045 | blue |
| 2,4-Disulfo-5-hydroxy-4'-4''-bis(diethylamino)triphenylcarbinol | 42051 | blue |
| 4-[(4-N-Ethyl-p-sulfobenzylamino)phenyl-(4-hydroxy-2-sulfophenyl)(methylene)-1-(N-ethyl-N-p-sulfobenzyl)-2,5-cyclohexadieneimine] | 42053 | green |
| Acid Blue 7 | 42080 | blue |
| (N-Ethyl-p-sulfobenzylamino)phenyl-(2-Sulfophenyl)methylene-(N-ethyl-N-p-sulfobenzyl)-Δ$^{2,5}$-cyclohexadienimine | 42090 | blue |
| Acid Green 9 | 42100 | green |
| Diethyldisulfobenzyldi-4-amino-2-chlorodi-2-methylfuchsonimmonium | 42170 | green |
| Basic Violet 14 | 42510 | violet |
| Basic Violet 2 | 42520 | violet |
| 2'-Methyl-4'-(N-ethyl-N-m-sulfobenzyl)amino-4''-(N-diethyl)-amino-2-methyl-N-ethyl-N-m-sulfobenzylfuchsonimmonium | 42735 | blue |
| 4'-(N-Dimethyl)amino-4''-(N-phenyl)aminonaphtho-N-dimethylfuchsonimmonium | 44045 | blue |
| 2-Hydroxy-3,6-disulfo-4,4'-bisdimethylaminonaphthofuchsonimmonium | 44090 | green |
| Acid Red 52 | 45100 | red |
| 3-(2'-Methylphenylamino)-6-(2'-methyl-4'-sulfophenylamino)-9-(2''-carboxyphenyl)xanthenium salt | 45190 | violet |
| Acid Red 50 | 45220 | red |
| Phenyl-2-oxyfluorone-2-carboxylic acid | 45350 | yellow |
| 4,5-Dibromofluorescein | 45370 | orange |
| 2,4,5,7-Tetrabromofluorescein | 45380 | red |
| Solvent Dye | 45396 | orange |
| Acid Red 98 | 45405 | red |
| 3',4',5',6'-Tetrachloro-2,4,5,7-tetrabromofluorescein | 45410 | red |
| 4,5-Diiodofluorescein | 45425 | red |
| 2,4,5,7-Tetraiodofluorescein | 45430 | red |
| Quinophthalone | 47000 | yellow |
| Quinophthalonedisulfonic acid | 47005 | yellow |
| Acid Violet 50 | 50325 | violet |
| Acid Black 2 | 50420 | black |
| Pigment Violet 23 | 51319 | violet |
| 1,2-Dioxyanthraquinone, calcium-aluminium complex | 58000 | red |
| 3-Oxypyrene-5,8,10-sulfonic acid | 59040 | green |
| 1-Hydroxy-4-N-phenylaminoanthraquinone | 60724 | violet |
| 1-Hydroxy-4-(4'-methylphenylamino)anthraquinone | 60725 | violet |
| Acid Violet 23 | 60730 | violet |
| 1,4-Di(4'-methylphenylamino)anthraquinone | 61565 | green |
| 1,4-Bis(o-sulfo-p-toluidino)anthraquinone | 61570 | green |
| Acid Blue 80 | 61585 | blue |
| Acid Blue 62 | 62045 | blue |
| N,N'-Dihydro-1,2,1',2'-anthraquinonazine | 69800 | blue |
| Vat Blue 6; Pigment Blue 64 | 69825 | blue |
| Vat Orange 7 | 71105 | orange |
| Indigo | 73000 | blue |

-continued

| Chemical or other name | CIN | Colour |
|---|---|---|
| Indigodisulfonic acid | 73015 | blue |
| 4,4'-Dimethyl-6,6'-dichlorothioindigo | 73360 | red |
| 5,5'-Dichloro-7,7'-dimethylthioindigo | 73385 | violet |
| Quinacridone Violet 19 | 73900 | violet |
| Pigment Red 122 | 73915 | red |
| Pigment Blue 16 | 74100 | blue |
| Phthalocyanine | 74160 | blue |
| Direct Blue 86 | 74180 | blue |
| Chlorinated phthalocyanines | 74260 | green |
| Natural Yellow 6, 19; Natural Red 1 | 75100 | yellow |
| Bixin, Nor-Bixin | 75120 | orange |
| Lycopene | 75125 | yellow |
| Trans-alpha-, beta- or gamma-carotene | 75130 | orange |
| Keto and/or hydroxyl derivatives of carotene | 75135 | yellow |
| 1,7-Bis(4-hydroxy-3-methoxyphenyl)-1,6-heptadiene-3,5-dione | 75300 | yellow |
| Complex salt (Na, Al, Ca) of carminic acid | 75470 | red |
| Chlorophyll a and b; copper compounds of chlorophylls and chlorophyllines | 75810 | green |
| Pigment Red 101 and 102 | 77015 | red |
| Carbon | 77266 | black |
| Pigment Black 9 | 77267 | black |
| Bismuth vanadate P. Y. 184 | | yellow |
| Carbo medicinalis vegetabilis | 77268 | black |
| Chromium oxide | 77288 | green |
| Chromium oxide, water-containing | 77278 | green |
| Pigment Blue 28, Pigment Green 14 | 77346 | green |
| Pigment Metal 2 | 77400 | brown |
| Gold | 77480 | brown |
| Iron oxides and hydroxides | 77489 | orange |
| Iron oxide | 77491 | red |
| Iron oxide hydrate | 77492 | yellow |
| Iron oxide | 77499 | black |
| Mixtures of iron(II) and iron(III) hexacyanoferrate | 77510 | blue |
| Manganese ammonium diphosphate | 77742 | violet |
| Manganese phosphate; $Mn_3(PO_4)_2.7\ H_2O$ | 77745 | red |
| Silver | 77820 | white |

It may furthermore be favourable to select, as dye, one or more substances from the following group:

2,4-dihydroxyazobenzene, 1-(2'-chloro-4'-nitro-1'-phenylazo)-2-hydroxy-naphthalene, Ceres Red, 2-(4-sulfo-1-naphthylazo)-1-naphthol-4-sulfonic acid, the calcium salt of 2-hydroxy-1,2'-azonaphthalene-1'-sulfonic acid, the calcium and barium salts of 1-(2-sulfo-4-methyl-1-phenylazo)-2-naphthyl-carboxylic acid, the calcium salt of 1-(2-sulfo-1-naphthylazo)-2-hydroxy-naphthalene-3-carboxylic acid, the aluminium salt of 1-(4-sulfo-1-phenylazo)-2-naphthol-6-sulfonic acid, the aluminium salt of 1-(4-sulfo-1-naphthylazo)-2-naphthol-3,6-disulfonic acid, 1-(4-sulfo-1-naphthylazo)-2-naphthol-6,8-disulfonic acid, the aluminium salt of 4-(4-sulfo-1-phenylazo)-2-(4-sulfophenyl)-5-hydroxypyrazolone-3-carboxylic acid, the aluminium and zirconium salts of 4,5-dibromofluorescein, the aluminium and zirconium salts of 2,4,5,7-tetrabromofluorescein, 3',4',5',6'-tetrachloro-2,4,5,7-tetrabromofluorescein and its aluminium salt, the aluminium salt of 2,4,5,7-tetraiodofluorescein, the aluminium salt of quinophthalonedisulfonic acid, the aluminium salt of indigodisulfonic acid, red and black iron oxide (CIN: 77 491 (red) and 77 499 (black)), iron oxide hydrate (CIN: 77492).

Luminescent colorants which are suitable in the present invention are all organic or inorganic luminescent dyes or pigments known to the person skilled in the art which exhibit fluorescence or phosphorescence. Examples of organic luminescent dyes or pigments are those from the group consisting of the naphthalimides, coumarins, xanthenes, thioxanthenes, naphtholactams, azlactones, methines, oxazines, thiazines, such as, for example, sulfoflavine, 7-dialkylcoumarin, fluorescein, rhodamine, benzoxanthene, samarone, naphthostyril, flavines, fluorol, but also the pigments known under the names Solvent Yellow 44, Solvent Yellow 160, Basic Yellow 40, Basic Red 1, Basic Violet 10 and Acid Red 52. Further examples are given, inter alia, in Ullmann's Encyclopedia of Industrial Chemistry, Internet Edition, 7th Edition, 2003, and are adequately known to the person skilled in the art.

Examples of inorganic luminescent dyes or pigments are corresponding sulfides, such as, for example, CaS:Bi, CaSrS:Bi, ZnS:Cu, ZnS:$Pb^{2+}$, ZnS:$Mn^{2+}$, ZnCdS:Cu, $AB_2S_4$ (where A=alkaline earth metal; B=aluminium), ZnS, ZnS: Ag, ZnS:Cu:Cl, ZnS:Cu:Al, $Ce_3(SiS_4)_2X$ (where X=Cl, Br, I), $La_{3-x}Ce_x(SiS_4)_2I$ (where $0 \leq x \leq 1$), SrS:Cr, SrS doped with rare-earth metals or Mn, CdS:Mn, $Y_2O_2S$:(Er,Yb), also fluorides, such as, for example, $AF_3$ (where A=$La^{3+}$, $Ce^{3+}$, $Y^{3+}$, $Al^{3+}$, $Mg^{2+}$, $Ca^{2+}$, $Pb^{2+}$ and containing at least one luminescent ion selected from the group consisting of the trivalent ions ($Cr^{3+}$, $Fe^{3+}$, etc.) or rare earths ($Y^{3+}$, $Pr^{3+}$, $Nd^{3+}$, $Sm^{3+}$, $Eu^{3+}$, $Tb^{3+}$, $Dy^{3+}$, $Ho^{3+}$, $Er^{3+}$, $Tm^{3+}$, $Yb^{3+}$)), $LnF_3$, $ALnF_4$, $AeLn_2F_8$, $ALn_3F_{10}$ (where Ln=rare earths and yttrium, A=monovalent alkali metal ion, Ae=divalent alkaline earth or transition metal ion, such as, for example, $Mg^{2+}$, $Ca^{2+}$, $Sr^{2+}$, $Ba^{2+}$, $Zn^{2+}$ and containing at least one luminescent ion selected from the group consisting of the trivalent ions ($Cr^{3+}$, $Fe^{3+}$, etc.) or rare earths ($Y^{3+}$, $Pr^{3+}$, $Nd^{3+}$, $Sm^{3+}$, $Eu^{3+}$, $Tb^{3+}$, $Dy^{3+}$, $Ho^{3+}$, $Er^{3+}$, $Tm^{3+}$, $Yb^{3+}$)), $EF_3$ (E=$Ga^{3+}$, $In^{3+}$, $Bi^{3+}$ and containing at least one luminescent ion selected from the group consisting of the trivalent ions ($Cr^{3+}$, $Fe^{3+}$, etc.) or rare earths ($Y^{3+}$, $Pr^{3+}$, $Nd^{3+}$, $Sm^{3+}$, $Eu^{3+}$, $Tb^{3+}$, $Dy^{3+}$, $Ho^{3+}$, $Er^{3+}$, $Tm^{3+}$, $Yb^{3+}$), $Sr_{1-x}Eu^{2+}{}_xSiF_6 \cdot 2H_2O$ (where $0<x\leqq0.5$), $M_{1-x}Eu_x{}^{2+}SiF_6$ (where $0<x\leqq0.2$ and M is at least one ion selected from barium and strontium), $K_2YF_5$ (doped with $Gd^{3+}$, $Tb^{3+}$, $Eu^{3+}$ or $Pr^{3+}$), $LiYF_4$ (doped with $Gd^{3+}$, $Tb^{3+}$, $Eu^{3+}$ or $Pr^{3+}$), $NaLnF_4$ (where Ln=lanthanoid or Y), $NaYF_4:Pr^{3+}$, $Na(Y,Yb)F_4:Pr^{3+}$, $Na_3AlF_6$ (containing at least one luminescent ion selected from the group consisting of the trivalent ions ($Cr^{3+}$, $Fe^{3+}$, etc.) or rare earths ($Y^{3+}$, $Pr^{3+}$, $Nd^{3+}$, $Sm^{3+}$, $Eu^{3+}$, $Tb^{3+}$, $Dy^{3+}$, $Ho^{3+}$, $Er^{3+}$, $Tm^{3+}$, $Yb^{3+}$)), $BaLiF_3:Eu^{3+}$, $BaY_2F_8:Eu^{3+}$, $BaSiF_6:Eu^{3+}$, $\alpha\text{-}NaYF_4:Pr^{3+}$ or $LiGdF_4:Eu^{3+}$. Also suitable are luminescent oxides, such as, for example, $MAl_2O_4$ (where M=one or more metals selected from calcium, strontium and barium, the matrix may be doped with europium as activator and may optionally contain other rare earths, such as, for example, lanthanum, cerium, praseodymium, neodymium, samarium, gadolinium, dysprosium, holmium, erbium, thulium, ytterbium, lutetium or ti, and bismuth as coactivator(s), as in $SrAl_2O_4(Eu^{2+}, Dy^{3+})$), $(M'_xM''_y)Al_2O_4$ (where x+y=1 and M' and M'' are different and are selected from calcium, strontium and barium, the matrix may be doped with europium as activator and may optionally contain other rare earths, such as, for example, lanthanum, cerium, praseodymium, neodymium, samarium, gadolinium, dysprosium, holmium, erbium, thulium, ytterbium, lutetium or tin, and bismuth as coactivator(s)), $M_{1-x}Al_2O_{4-x}$ (where M is at least one metal selected from calcium, strontium and barium or in which M comprises magnesium and at least one metal selected from calcium, strontium and barium, and X is not zero, the matrix may be doped with europium as activator and may optionally contain other rare earths, such as, for example, lanthanum, cerium, praseodymium, neodymium, samarium, gadolinium, dysprosium, holmium, erbium, thulium, ytterbium, lutetium or tin, and bismuth as coactivator(s)), $LnBO_3$ (where Ln=at least one element of the rare earths), $M(II)_{1-x}Eu(II)_xM(III)_pEu(III)_qTb(III)_rB_9O_{16}$ (where M(II) is at least one bivalent metal selected from barium, strontium, lead and calcium, M(III) is selected from lanthanum, gadolinium, yttrium, cerium, lutetium and bismuth, $0\leqq x\leqq 0.2$, p, q and r are not zero and p+q+r=1), $Ln_{1-x}Tb_xMgB_5O_{10}$ (where Ln=at least one element selected from the rare earths and/or yttrium and $0<x\leqq1$), $M_{5(1-a)}Eu_{5a}{}^{2+}SiO_4X_6$ (where $M=Ba_{1-b}Sr_b$ or $Ba_{1-b}Ca_{62}$, where $0\leqq b\leqq0.1$ and $0\leqq a\leqq0.2$ and $X=Cl_{1-c}Br_c$ where $0\leqq c\leqq1$), $La_{1-x}Sm_xOBr$ (where $0<x\leqq0.1$), $Zn_{3.5}Y_{0.92}Eu_{0.08}O_5$, ZnO:Zn, $ZnO:Ga_2O_3:Bi$, $CaTiO_3:Pr^{3+}$, $La_2TiO_5:Pr^{3+}$, $La_2Ti_2O_7:Pr^{3+}$, $(La,Pr)_2Ti_2O_7$, $(La,Yb,Pr)_2Ti_2O_7$, $YBO_3:(Eu^{3+}, Tb^{3+}, Gd^{3+})$, $Y_3BO_6:Eu^{3+}$, $LnBO_3$ (doped with $Eu^{3+}$, $Tb^{3+}$, $Pr^{3+}$ or $Tm^{3+}$, doped or co-doped with $Ce^{3+}$ or $Gd^{3+}$ and $Eu^{3+}$, $Tb^{3+}$, $Tm^{3+}$ or $Pr^{3+}$), $Ln_3BO_6$ (doped with $Eu^{3+}$, $Tb^{3+}$, $Pr^{3+}$ or $Tm^{3+}$, doped or co-doped with $Ce^{3+}$ or $Gd^{3+}$ and $Eu^{3+}$, $Tb^{3+}$, $Tm^{3+}$ or $Pr^{3+}$), $Ln(BO_2)_3$ (doped with $Eu^{3+}$, $Tb^{3+}$, $Pr^{3+}$ or $Tm^{3+}$, doped or co-doped with $Ce^{3+}$ or $Gd^{3+}$ and $Eu^{3+}$, $Tb^{3+}$, $Tm^{3+}$ or $Pr^{3+}$), $SiO_2$ (doped with rare earths), $SiO_2:(Sm^{3+},Al^{3+})$, $Al_{(2-x-y)}(Y,Ln)_xO_3:yM$ (where $M=Cr_2O_3$, $V_2O_5$, NiO, $WO_3$, CuO, FeO, $Fe_2O_3$ and Ln=Er, La, Yb, Sm, Gd and mixtures thereof and $0.48\leqq x\leqq1.51$ and $0.007\leqq y\leqq0.2$), or $Al_2O_3$ doped with rare earths. Also suitable are nitrides or oxynitrides, such as, for example, GaN:Mg, $Si_3N_4$ (containing at least one luminescent ion selected from the group consisting of the trivalent ions ($Cr^{3+}$, $Fe^{3+}$, etc.) or rare earths ($Y^{3+}$, $Pr^{3+}$, $Nd^{3+}$, $Sm^{3+}$, $Eu^{3+}$, $Tb^{3+}$, $Dy^{3+}$, $Ho^{3+}$, $Er^{3+}$, $Tm^{3+}$, $Yb^{3+}$)) or $Zr_xO_yN_z:Eu^{3+}$ (where x>0, y>0 and z>0). Further examples are given, inter alia, in Ullmann's Encyclopedia of Industrial Chemistry, Internet Edition, 7th Edition, 2003. The luminescent colorant may of course also comprise mixtures of in each case one or more of the above-mentioned organic or inorganic luminescent dyes or pigments. Preferred luminescent dyes or pigments are copper-doped zinc sulfide, silver-doped zinc sulfide or organic luminescent agents, for example fluoresceins or rhodamines, naphthalimides, such as Solvent Yellow 44.

It is part of the general knowledge of the person skilled in the art to know which of the said colorants are themselves suitable as layer material in the sense of the present invention and which colorants may be present, alone or as a mixture, in layers of other materials. For example, inorganic colorants, in particular coloured oxides, are frequently themselves suitable as layer material and are preferably also employed as such. The distribution of the colorants in the layers plays a secondary role overall. The colorants may be present uniformly throughout the layer, but also in the form of a gradient in the layer, for example principally at the surface of the layers.

The groove or grid structure can consist of regularly arranged, parallel or crossed lines, hemispheres, spheres, pyramids, cubes or correspondingly shaped holes. The spheres can be mono- or multicoated spheres made from organic or inorganic materials. The geometrical shape of the groove or grid elements is of secondary importance for the colour effect; the important factors are the uniformity of the size of the groove or grid elements and their separations. In order to achieve particularly intense colour effects, the separations of adjacent grooves or grids are in the range from 250 nm to 2000 nm and are thus in the order of magnitude of the wavelength of light.

The effect pigments in the simplest embodiment may additionally be coated with one or more transparent, semi-transparent and/or opaque layers of metal oxides, metal oxide hydrates, metal suboxides, metals, metal fluorides, metal nitrides, metal oxynitrides, metal phosphates or mixtures of these materials. The metal oxide, metal oxide hydrate, metal suboxide, metal, metal fluoride, metal nitride, metal oxynitride layers or the mixtures thereof can be of low refractive index (refractive index <1.8) or high refractive index (refractive index ≧1.8). These layers can function as colouring system, where the colour impression can be effected both by absorption and by interference. Suitable materials for the layers of metal oxides, metal oxide hydrates, metal suboxides, metal fluorides, metal nitrides, metal oxynitrides or metal phosphates are the materials already mentioned above. Suitable metals are, for example, chromium, aluminium, nickel, silver, gold, titanium, copper or alloys. Metal oxide, metal, metal fluoride and/or metal oxide hydrate layers and very particularly preferably metal oxide and/or metal oxide hydrate layers are preferably applied to the substrate layer. Furthermore, multilayered structures comprising high- and low-refractive-index metal oxide, metal oxide hydrate, metal or metal fluoride layers may also be present, where high- and low-refractive-index layers preferably alternate. Particular preference is given to layer packages comprising a high-refractive-index layer and a low-refractive-index layer, it being possible for one or more of these layer packages to be applied to the substrate layer. The sequence of the high- and low-refractive-index layers here can be matched to the substrate layer in order to incorporate the substrate layer into the multilayered structure. In a further embodiment, the metal oxide, metal oxide hydrate, metal suboxide, metal fluoride, metal nitride or metal oxynitride layers can likewise be mixed or doped with colorants or other elements or may themselves be a colorant. Suitable colorants are those already mentioned, with suitable elements being, for example, yttrium or antimony. The application of one or more transparent, semitransparent and/or opaque layers of the above-mentioned materials to the substrate layer is preferred in the present invention. Effect pigments comprising these layers exhibit a wide variety of colours with respect to their mass tone and can in many cases exhibit an angle-dependent change in the colour (colour flop) due to interference. The combination of these colour properties gives rise to particular advantages in the applications. Thus, a large latitude is created in the colour of the effect pigments and the materials pigmented therewith which is not possible with pigments from the prior art alone. The user can select a desired colour effect and is not reliant on the addition of further pigments in order to achieve this colour effect.

In a preferred embodiment, the outer layer on the substrate layer is a high-refractive-index metal oxide. This outer layer may additionally be on the above-mentioned layer packages or part of a layer package and can consist, for example, of $TiO_2$, titanium suboxides, $Fe_2O_3$, $SnO_2$, ZnO, $Ce_2O_3$, CoO, $Co_3O_4$, $V_2O_5$, $Cr_2O_3$ and/or mixtures thereof, such as, for example, ilmenite or pseudobrookite. $TiO_2$ is particularly preferred.

Examples and embodiments of the material combinations and layer structures mentioned above are given by way of example in the common literature for effect pigments, for example in Research Disclosures RD 471001 and RD 472005, including the literature cited therein, the disclosure content of which is incorporated herein by way of reference.

The thickness of the one or more layers of metal oxides, metal oxide hydrates, metal suboxides, metals, metal fluorides, metal nitrides or metal oxynitrides or a mixture thereof is usually from 3 to 300 nm and in the case of the metal oxide, metal oxide hydrate, metal suboxide, metal fluoride, metal nitride, metal oxynitride layers or a mixture thereof is preferably from 20 to 200 nm. The thickness of the metal layers is preferably from 4 to 100 nm. Control of the thickness of the coating by the person skilled in the art enables the colour effects achieved by the pigments according to the invention to be influenced further.

The thickness of the coloured flake-form effect pigments can vary within broad ranges and is not important for the colour effects which occur. The thickness is preferably from 0.3 to 2 μm. The diameter of the pigments according to the invention can be varied within broad ranges, depending on the application. Preferred sizes are in the range from 5 to 500 μm and in particular between 10 and 250 μm.

In a further embodiment of the present invention, the flake-form effect pigments according to the invention comprise a colourless substrate layer comprising no colorants and having a groove or grid structure and to which one or more layers have been applied on at least one side, where at least one of the layers comprises one or more colorants or is itself a colorant. The one or more layers are preferably applied to a plurality of sides of the substrate layer and in particular the substrate layer is completely encased by the one or more layers. The colourless substrate layer comprising no colorants can consist here, inter alia, of metal oxides, metal oxide hydrates, metal suboxides, metal fluorides, metals, metal nitrides, metal oxynitrides, metal phosphates or mixtures of these materials. Suitable metal oxides and metal oxide hydrates are all colourless metal oxides or metal oxide hydrates known to the person skilled in the art, such as, for example, silicon oxide, silicon oxide hydrate, tin oxide, cerium oxide, zinc oxide, titanium oxide, in particular silicon dioxide, aluminium oxide, titanium dioxide, titanium oxide hydrate, and mixtures thereof. A suitable metal fluoride is, for example, magnesium fluoride. Metal nitrides or metal oxynitrides which can be employed are, for example, the nitrides or oxynitrides of the metals titanium, zirconium and/or tantalum. Suitable metals are, for example, chromium, aluminium, nickel, silver, gold, titanium, copper or alloys. Metal oxides, metal fluorides, metals and/or metal oxide hydrates are preferably employed as material for the substrate layer. Suitable for this purpose are, in particular, magnesium fluoride, aluminium oxide, titanium dioxide, silicon dioxide, zirconium oxide, aluminium and/or mixtures of these materials.

Examples of the materials of the one or more layers (metal oxides, metal oxide hydrates, metal suboxides, metals, metal fluorides, metal nitrides, metal oxynitrides, metal phosphates or mixtures of these materials) or the materials which are suitable as colorant have already been mentioned in the description of the simplest embodiment and can be combined with one another here in any desired form.

In an embodiment of the present invention which is likewise in accordance with the invention, the flake-form effect pigments according to the invention comprise a colourless substrate layer comprising no colorants and having a groove or grid structure and to which one or more colourless layers or layers comprising no colorants have optionally been applied on at least one side, and which is encased with a polymer layer comprising one or more colorants. Examples of suitable materials for the substrate layer (metal fluorides, metal oxides, metal oxide hydrates, metal suboxides, metals, metal nitrides, metal oxynitrides, metal phosphates or mixtures of these materials), for the one or more colourless layers or layers comprising no colorants (metal oxides, metal oxide hydrates, metal suboxides, metals, metal fluorides, metal nitrides, metal oxynitrides, metal phosphates or mixtures of these materials) or the materials which are suitable as colorant and the thicknesses and sizes thereof have already been mentioned above and can be combined with one another here in any desired form.

A suitable polymer for the polymer layer is in principle any polymer known to the person skilled in the art which can be applied as a layer. The polymer is preferably a crosslinked melamine-formaldehyde resin, urea-formaldehyde resin, epoxy resin, phenolic resin or a crosslinked polystyrene. In the crosslinked melamine-formaldehyde resins, some of the melamine molecules may also have been replaced by other crosslinkable molecules, such as, for example, phenols, guanamines or urea. The melamine-formaldehyde resins can be unetherified or etherified melamine-formaldehyde adducts, for example alkoxymethylolmelamines containing $C_1$-$C_6$-alkoxy groups, such as methoxy or n-butoxy groups, and precondensates. An unetherified resin which may be mentioned by way of example is Madurit MW 909 and an etherified resin which may be mentioned by way of example is Madurit SMW 818 (both products from UBC, Wiesbaden, Germany). Some of the melamine-formaldehyde resin may also be replaced by other crosslinking organic polymers. Further examples and embodiments are given in WO 03/074614, the disclosure content of which is incorporated herein by way of reference.

Effect pigments in accordance with this embodiment are distinguished, in addition to the colour effects described, by a smooth pigment surface. In addition, the polymer encasing increases the mechanical stability of the pigment. This gives rise to applicational advantages which allow the use of the effect pigments according to the invention in areas in which, owing to the high mechanical load, structured effect pigments from the prior art could only be used with difficulty, or not at all, such as, for example, flexographic or offset printing inks, bodywork paints, extruded plastic parts or cosmetic compact powders.

In a further embodiment, the pigments according to the invention are formed by the regular arrangement of colorants comprising monodisperse spheres embedded in a matrix. In the simplest embodiment, the mono-disperse spheres consist, for example, of colorant-containing polymers or a colorant-containing metal oxide, preferably having a refractive index of >1.7, such as, for example, aluminium oxide, titanium oxide or zirconium oxide. Alternatively, the monodisperse spheres can also consist of materials comprising no colorants which have been provided with layers containing one or more colorants. The sphere bodies are preferably made from metal oxides and in particular from silicon oxide comprising no colorant. These spheres may have been coated with layers containing one or more colorants, preferably with a metal oxide having a refractive index of >1.7. Particularly suitable for this purpose are titanium oxide, aluminium oxide, iron oxide, zirconium oxide or mixtures of these materials.

The structure of the monodisperse spheres and processes for their production are described, for example, in EP 0 803 550. The diameter of the spheres can be from 100 to 1000 nm, preferably from 200 to 700 nm. For fixing the coated or uncoated spheres, the latter are embedded in a matrix in the pigments according to the invention. The material used for the matrix can be organic binders, but also inorganic materials. Suitable organic binders are all film-forming organic polymers known to the person skilled in the art which can be crosslinked after formation of the film and formation of the regular grid structure. Suitable matrix materials are, for example, epoxy resins, melamine-formaldehyde resins or acrylates. Suitable inorganic matrix materials are, in particular, network-forming materials, such as, for example, metal titanates, metal aluminates, oxides, such as titanium oxide, aluminium oxide, zirconium oxide or silicon oxide. Preference is given to the use of silicon dioxide.

The effect pigments according to the invention may furthermore be provided with an additional inorganic and/or organic post-coating as outer layer. Examples of coatings of this type are given, for example, in EP 0 632 109, U.S. Pat. No. 5,759,255, DE 43 17 019, DE 39 29 423, DE 32 35 017, EP 0 492 223, EP 0 342 533, EP 0 268 918, EP 0 141 174, EP 0 764 191, WO 98/13426 or EP 0 465 805, the disclosure content of which is incorporated herein by way of reference. Effect pigments comprising this inorganic and/or organic post-coating, for example of organosilanes or organotitanates or organozirconates, additionally exhibit, besides the optical properties already mentioned, increased stability to weathering influences, such as, for example, moisture and light, which is of particular interest especially for industrial coatings and in the automobile sector.

Further embodiments or the combination of the above-mentioned embodiments of the present invention are within the expert knowledge of the person skilled in the art and fall within the scope of the present invention. Thus, the individual embodiments may also comprise a plurality of layers containing colorants or consisting of colorants, which results in a combination or superimposition of the individual colour effects in the effect pigments.

The pigments according to the invention can be prepared in a simple manner. The invention therefore also relates to processes for the preparation of the effect pigments according to the invention in which a body provided with a groove or grid structure, which may be applied to a support, is coated with one or more layers, where at least one of the layers comprises one or more colorants or is itself a colorant, and the coloured flake-form effect pigments are obtained either by detachment from the structured body or by separation from the support together with the structured body.

In an embodiment of the process according to the invention, a body provided with a groove or grid structure is coated with a substrate layer comprising one or more colorants or with a coloured substrate layer, and the coloured flake-form effect pigment is obtained by detachment of the substrate layer from the structured body. The effect pigments according to the invention obtained in this way may additionally be coated with one or more transparent, semitransparent and/or opaque layers of metal oxides, metal oxide hydrates, metal suboxides, metals, metal fluorides, metal nitrides, metal oxynitrides, metal phosphates or mixtures of these materials.

In an alternative embodiment of the process according to the invention, a body provided with a groove or grid structure is coated with a colourless substrate layer or a substrate layer comprising no colorants, one or more layers are subsequently applied, where at least one of the layers comprises one or more colorants or is itself a colorant, and the coloured flake-form effect pigment is obtained by detachment from the structured body.

In a further variant, the effect pigments according to the invention can be prepared by a process in which a body provided with a groove or grid structure is coated with a colourless substrate layer or a substrate layer comprising no colorants, the substrate layer is detached from the structured body, and one or more layers are subsequently applied to the detached substrate layer, where at least one of the layers comprises one or more colorants or is itself a colorant.

In a variant which is likewise in accordance with the invention, the effect pigments according to the invention can be prepared by a process in which a body provided with a groove or grid structure is coated with a colourless substrate layer or a substrate layer comprising no colorants, the substrate layer is detached from the structured body, one or more colourless layers or layers comprising no colorants are optionally subsequently applied to the detached substrate layer, and finally a polymer layer comprising one or more colorants is applied. The polymer layer is preferably a crosslinked melamine-formaldehyde resin formed by deposition of crosslinking melamine-formaldehyde resins on the one or more layers, followed by curing or crosslinking of the melamine-formaldehyde resins. Further examples and embodiments of this process are given in WO 03/074614.

The materials which are suitable for the substrate layer, the one or more layers or as colorants in the individual process variants have already been mentioned in the description of the effect pigments according to the invention.

The bodies provided with a groove or grid structure can be, for example, in the form of a correspondingly structured film,; a structured tape or a drum having a structured surface. Other structured materials known to the person skilled in the art can likewise be employed. The grid structure on the bodies can consist of regularly arranged, parallel or crossed grooves, lines, hemispheres, spheres, pyramids, cubes or correspondingly shaped holes. Preference is given to the use of grids comprising regularly arranged lines, grooves or spheres.

Grids comprising regularly arranged spheres can be produced, for example, by application of a suspension of monodisperse spheres and a film-forming matrix to a support having a smooth surface, such as, for example, a film. EP 0 216 278 discloses monodisperse spheres of this type. After application of the film, the particles are further arranged in closest spherical packing by the surface forces and the material transport during the drying operation. The interspaces between the spheres themselves and the interspaces between the spheres and the surface of the support are filled by the matrix material. Suitable matrix materials are the transparent or semitransparent materials mentioned in this application, but also organic binders. The formation of nanostructures of this type by self-organisation of particles and the mechanisms for this are described, for example, by F. Burmeister, J. Boneberg, P. Leiderer, Physikalische Blätter 2000, 56, 49-50. The particles arranged in this way can be fixed in the matrix by crosslinking of the film-forming matrix material. The crosslinking here can take place in all manners known to the person skilled in the art, such as, for example, condensation or addition reactions, polymerisation of suitable monomers and by thermally, photochemically or pH-induced crosslinking. The film obtained can be dried, irrigated and detached from the support. In this way, bodies structured with spheres are obtained which can be employed in the process for the preparation of the pigments according to the invention. In addition, this procedure is also suitable for the direct preparation of the particular embodiment of the pigments according to the invention in which a combination of a regular grid of spheres comprising colorants or spheres comprising no colorants which are coated with one or more layers is present, where at least one of the layers comprises colorants. The pigments according to the invention can be obtained by detachment of the film from the spheres embedded in the binder and comminuting the film. Preference is given to the use of spheres made from materials of high refractive index (>1.7) or spheres coated with high-refractive-index materials.

The coating of the structured bodies with a substrate layer or the coating of the substrate layer with one or more layers for the preparation of the pigments according to the invention can be carried out wet-chemically, by the sol-gel process or via PVD and/or CVD processes. The structured body here can be applied to a support, such as, for.example, an embossed release layer on a film or a drum.

In the case of coating by the sol-gel process, metal alkoxides are preferably applied to the structured bodies in the form of a solution, the metal alkoxides are decomposed hydrolytically using water, the resultant film is dried and either detached from the structured body or detached from a support in combination with the structured body. Further embodiments can be derived by the person skilled in the art in an obvious manner.

Alternatively, the coating can also be carried out wet-chemically, for example by application of aqueous sols and solutions to the structured bodies, precipitation of a layer, drying and detachment of the coating from the body or from a support together with the body. A preferred example is the deposition of silicon dioxide from water-glass. In addition, all processes known to the person skilled in the art for the precipitation and formation of the layer-forming materials are suitable.

The coating of a structured body for the preparation of the effect pigments according to the invention can also be carried out via PVD or CVD processes. These processes are known from the literature, for example from U.S. Pat. No. 3,123,489.

The one or more colorants can be added to the corresponding layer precursors in any desired form, for example as a solid, in the form of a suspension or as a solution. The one or more colorants are preferably added directly to the layer-forming solutions in order to ensure in this way optimum distribution in the substrate layer or the one or more layers. The colorants here can also be added in a manner which results in a concentration gradient with respect to the colorant in the layer. Thus, for example, the colorant can be introduced in the region of the surface.

In the coating, the body structure is in the simplest case transferred to the coating material. The structured body acts in the coating as negative for the surface of the pigment particles that was in contact with the body. The opposite surface which was not in contact with the body generally exhibits only a weak image of the relief and may be completely flat in the case of thicker particles. The pigments according to the invention formed in this way can be detached from the structured support material and comminuted. Alternatively, pigments according to the invention can be obtained if the applied material is separated off in combination with the structured body. This procedure is particularly suitable for the preparation of the pigments according to the invention in which a regular grid of mono- or multicoated spheres is present.

Further processes for the preparation of the effect pigments according to the invention can be used in a manner familiar to the person skilled in the art.

Owing to their advantageous properties, the effect pigments according to the invention are suitable for a broad range of applications. The invention therefore also relates to the use of the effect pigments according to the invention in cosmetics, surface coatings, paints, pigment compositions, dry preparations, plastics, films, in security applications, as tracers, for laser marking, for colouring seed, for colouring foods or in medicament coatings.

In the case of cosmetics, the pigments according to the invention are particularly suitable for products and formulations in decorative cosmetics, such as, for example, nail varnishes, colouring powders, lipsticks or eye-shadows, soaps, toothpastes etc. The pigments according to the invention can of course also be combined in the formulations with cosmetic raw materials and assistants of all types. These include, inter alia, oils, fats, waxes, film formers, preservatives and assistants which generally determine applicational properties, such as, for example, thickeners and rheological additives, such as, for example, bentonites, hectorites, silicon dioxide, Ca silicates, gelatine, high-molecular-weight carbohydrates and/or surface-active assistants, etc. The formulations comprising pigments according to the invention can belong to the lipophilic, hydrophilic or hydrophobic type. In heterogeneous formulations with discrete aqueous and nonaqueous phases, the pigments according to the invention may be present in only one of the two phases in each case or alternatively distributed over both phases.

The pH values of the formulations can be between 1 and 14, preferably between 2 and 11 and particularly preferably between 5 and 8. The concentrations of the interference pigments according to the invention in the formulation are not subject to any limits. They can be—depending on the application—between 0.001 (rinse-off products, for example shower gels) and 100% (for example lustre-effect articles for particular applications). The pigments according to the invention may furthermore also be combined with cosmetic active ingredients. Suitable active ingredients are, for example, insect repellents, UV A/BC protection filters (for example OMC, B3 and MBC), anti-ageing active ingredients, vitamins and derivatives thereof (for example vitamin A, C, E, etc.), self-tanning agents (for example DHA, erythrulose, inter alia) and further cosmetic active ingredients, such as, for example, bisabolol, LPO, ectoin, emblica, allantoin, bioflavonoids and derivatives thereof.

On use of the pigments in paints and surface coatings, all areas of application known to the person skilled in the art are possible, such as, for example, powder coatings, automobile paints, printing inks for gravure, offset, screen or flexographic printing and paints in outdoor applications. For preparation of the printing inks, a multiplicity of binders, in particular water-soluble grades, is suitable, for example based on acrylates, methacrylates, polyesters, polyurethanes, nitrocellulose, ethylcellulose, polyamide, polyvinyl butyrate, phenolic resins, maleic resins, starch or polyvinyl alcohol. The paints can be water- or solvent-based paints, the choice of paint constituents being part of the general knowledge of the person skilled in the art.

In addition, the pigments according to the invention can be used for the pigmenting of films and plastics, for example for agricultural sheeting, infrared-reflective films and panes, gift foils, plastic containers and mouldings for all applications known to the person skilled in the art. Particular preference is given to the use of the pigments according to the invention in transparent or semitransparent plastic articles. Suitable plastics are all common plastics for the incorporation of the mouldings according to the invention, for example thermosets or thermoplastics. The description of the possible applications and plastics which can be employed, processing methods and additives are given, for example, in RD 472005 or in R. Glausch, M. Kieser, R. Maisch, G. Pfaff, J. Weitzel, Perlglanzpigmente [Pearlescent Pigments], Curt R. Vincentz Verlag, 1996, 83 ff., the disclosure content of which is incorporated herein.

Owing to the particular angle-dependent colour effects in combination with the background colour, mass tone or luminescence colour, the pigments according to the invention are also suitable for use in security applications, such as, for example, security printing and in security-relevant features for, for example, forgery-proof cards and identity papers, such as, for example, entry tickets, personal identity cards, banknotes, checks and check cards, and for other forgery-proof documents. In the area of agriculture, the pigments can be used for colouring seed and other starting materials, in addition in the foods sector for pigmenting foods. The pigments according to the invention can likewise be employed for pigmenting coatings in medicaments, such as, for example, tablets or sugar-coated tablets, as described, for example, in DE 198 31 869 or U.S. Pat. No. 6,627,212.

The effect pigments according to the invention are likewise suitable for use in mixtures with organic dyes and/or pigments, such as, for example, transparent and opaque white, coloured and black pigments and with flake-form iron oxides, organic pigments, holographic pigments, LCPs (liquid crystal polymers) and conventional transparent, coloured and black lustre pigments based on metal oxide-coated flakes based on mica, glass, $Al_2O_3$, $Fe_2O_3$, $SiO_2$, etc. The effect pigments according to the invention can be mixed in any ratio with commercially available pigments and fillers.

Fillers which may be mentioned are, for example, natural and synthetic mica, nylon powder, pure or filled melamine resins, talc, glasses, kaolin, oxides or hydroxides of aluminium, magnesium, calcium, zinc, BiOCl, barium sulfate, calcium sulfate, calcium carbonate, magnesium carbonate, carbon, and physical or chemical combinations of these substances. There are no restrictions regarding the particle shape of the filler. It can be, for example, flake-form, spherical or needle-shaped, in accordance with requirements.

The pigments according to the invention are furthermore suitable for the preparation of flowable pigment compositions and dry preparations comprising one or more pigments according to the invention, binders and optionally one or more additives. The term dry preparations is also taken to mean preparations which comprise from 0 to 8% by weight, preferably from 2 to 8% by weight, in particular from 3 to 6% by weight, of water and/or a solvent or solvent mixture. The dry preparations are preferably in the form of pellets, granules, chips, sausages or briquettes and have particle sizes of 0.2-80 mm. The dry preparations are used, in particular, in the preparation of printing inks and in cosmetic formulations.

A particular potential application of the effect pigments according to the invention consists in their use as tracers in mixtures with further organic and/or inorganic colorants. Tracers are widely employed as identification means in modern products. With their aid, the aim is to demonstrate the authenticity of a product or to reconstruct the origin of a product. Common tracers are based on fluorescent, radioactive or luminescent substances, which are added to the product to be protected in the form of a powder, suspension or liquid. These substances are frequently toxicologically and environmentally dubious or require special apparatuses and equipment for detection.

The effect pigments according to the invention can be added to the colorants to be marked or products produced therefrom, such as, for example, paints, powders, coatings or suspensions, using all methods known to the person skilled in the art. The proportion of tracer in the product to be marked is usually $\leq 5\%$ by weight, preferably <2% by weight and very particularly preferably 0.1-1% by weight, based on the marked product.

Depending on the size of the effect pigments according to the invention, the tracer can be detected very simply in the mixtures by means of a microscope or using the scanning electron microscope. These tracers behave like other effect pigments in chemical and toxicological terms and are thus chemically inert and toxicologically acceptable. The effect pigments according to the invention can be admixed in very small amounts, so that the colour properties in the application are thus not significantly affected. Since the effect pigments according to the invention which are specifically matched to customer wishes for this application are not commercially available, adequate copy protection of the mixture to be marked is ensured.

Owing to the stability and chemically inert character, the effect pigments according to the invention can be employed simply and straightforwardly and processed in formulations. This invention likewise relates to formulations comprising the effect pigments according to the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

EXAMPLES

Example 1

80 g of Sicotrans® Yellow L 1916 (C.I. Pigment Yellow 42, BASF AG) are dispersed with the aid of a bead mill into a dilute water-glass solution comprising 1140 g of sodium water-glass (about 27.5% by weight of $SiO_2$) and 2800 ml of water containing 0.1% by weight of wefting agent (for example Triton® X100) as wetting aid and flow-control agent.

A polyethylene terephthalate film with a thickness of 100 µm with a regular groove structure having a groove separation of 1 µm and a groove depth of 250 nm embossed on the surface is coated with the resultant sodium water-glass suspension by the dip-coating method. The water-glass film is air-dried at 50° C. The dry film, with a thickness of about 700 nm, is detached from the substrate in the form of large flakes and subsequently irrigated at pH 5, with the pH of the bath being kept constant using dilute hydrochloric acid. After the irrigation, the $SiO_2$ flakes are dried, then calcined at 700° C. and subsequently crushed to give pigment flakes having a diameter of 10-80 µm. The flakes obtained exhibit a precise impression of the groove structure embossed on the film.

Example 2

10 g of the flakes from Example 1 are suspended in 250 ml of water. An $SnCl_4$ solution (preparation: 1.1 g of $SnCl_4*5\ H_2O$ dissolved in 2 ml of conc. hydrochloric acid and 17 ml of water) is added dropwise at a metering rate of 0.1 ml/min with vigorous stirring at 75° C. and pH 1.8. The temperature is subsequently raised to 90° C., the pH is lowered to 1.5, and 40 ml of a $TiCl_4$ solution (content: 380 g of $TiCl_4$ per liter) are added dropwise. The pH is kept constant through addition of dilute sodium hydroxide solution. When the addition is complete, the product obtained is filtered off, washed and dried, giving a golden power. The pigment obtained in this way is dispersed in nitrocellulose lacquer, and a paint card is produced by knife-coating the lacquer onto a board with a black field and a white field. The gold-yellow colour is evident under diffuse light, and a pronounced angle-dependent colour play is additionally evident under the directional light of a halogen lamp.

Example 3

A polyethylene terephthalate film with a thickness of 100 µm with a regular groove structure having a groove separation of 1 µm and a groove depth of 250 nm embossed on the surface is coated with a sodium water-glass solution (23% by weight of sodium orthosilicate) containing 0.1% by weight of wetting agent (for example Triton® X100) as wetting aid and flow-control agent by the dip-coating method. The sodium water-glass film is air-dried at 50° C. The dry film, with a thickness of about 700 nm, is detached from the substrate in the form of large flakes and subsequently irrigated at pH 5, with the pH of the bath being kept constant using dilute hydrochloric acid. After the irrigation, the $SiO_2$ flakes are dried, then calcined at 700° C. and subsequently crushed to give pigment flakes having a diameter of 10-80 µm. The flakes obtained exhibit a precise impression of the groove structure embossed on the film.

10 g of the flakes are suspended in 250 ml of water. An $SnCl_4$ solution (preparation: 1.1 g of $SnCl_4*5\ H_2O$ dissolved in 2 ml of conc. hydrochloric acid and 17 ml of water) is added dropwise at a metering rate of 0.1 ml/min with vigorous stirring at 75° C. and pH 1.8. The temperature is subsequently raised to 90° C., and, at pH 2.5, 40 ml of a solution of 13 ml of $TiCl_4$ (380 g of $TiCl_4$ per liter), 24 g of $FeCl_3$ solution (14.25% of Fe) and 2.4 g of $AlCl_3*6\ H_2O$, made up to 50 ml of solution with distilled water, are added dropwise. The pH is kept constant through addition of dilute sodium hydroxide solution. When the addition is complete, the product obtained is filtered off, washed and dried, giving a golden power. The pigment obtained in this way is dispersed in nitrocellulose lacquer, and a paint card is produced by knife-coating the lacquer onto a board with a black field and a white field. The golden colour is evident under diffuse light, and a pronounced angle-dependent colour play is additionally evident under the directional light of a halogen lamp.

Example 4

A polyethylene terephthalate film with a thickness of 100 µm with a regular groove structure having a groove separation of 1 µm and a groove depth of 250 nm embossed on the surface is coated with the aid of an application roller, with a 20% titanium tetrachloride solution containing 0.3% by weight of a wetting agent (disperse AYD W-28) as wetting aid and flow-control agent. The titanium oxide chloride-containing film is air-dried at 70° C., during which the titanium chloride hydrolyses to titanium dioxide. The dry film with a thickness of about 200 nm is detached from the substrate in the form of large flakes in a detachment trough using deionised water. The titanium dioxide flakes obtained are concentrated by decantation and subsequently coated with further titanium dioxide in suspension. The pigment is separated off by filtration, washed, dried and subsequently calcined in a tubular furnace under nitrogen at 850° C. for a period of 45 minutes in a nitrogen/ hydrogen atmosphere with a proportion by volume of hydrogen of 3%, giving a pigment powder with a pale red-brown mass tone. The pigment obtained is dispersed in nitrocellulose lacquer, and a transparent PET film is coated with the lacquer. When the film is viewed in diffuse light, the red-brown mass tone dominates, while intense angle-dependent interference colours are evident in transmitted light against a white light source.

Example 5

A polyethylene terephthalate film with a thickness of 100 µm with a regular groove structure having a groove separation of 1 µm and a groove depth of 250 nm embossed on the surface is coated with the aid of an application roller, with a 20% titanium tetrachloride solution containing 0.3% by weight of a wetting agent (disperse AYD W-28) as wetting aid and flow-control agent.

The titanium oxide chloride-containing film is air-dried at 70° C., during which the titanium chloride hydrolyses to titanium dioxide. The dry film with a thickness of about 200 nm is detached from the substrate in the form of large flakes in a detachment trough using deionised water. The titanium dioxide flakes obtained are concentrated by decantation and subsequently coated with further titanium dioxide in suspension. The pigment is separated off by filtration, washed, dried and subsequently calcined at 850° C. for a period of 45 minutes under air, giving a pure-white pigment powder.

1 ml of 2% formic acid is added at 70° C. with vigorous stirring to 3 g of the crude pigment in a mixture of 2 g of Madurit SMW 818 (melamine-formaldehyde resin from UBC), 80 g of water, 0.1 ml of Blankophor P liquid (Bayer AG, optical brightener) and 0.5 mg of Rhodamin B (fluorescent dye, Merck KGaA). After 15 minutes, the coating of the pigment with the melamine resin layer containing the fluorescent dye is complete. The solid is filtered off with suction, washed and dried. The resultant pigment exhibits strong red fluorescence under UV light with a wavelength of 366 nm. When brushed onto a black board, the pigment exhibits intense rainbow colours under white light of a halogen lamp. On illumination with UV light, the red fluorescence colour appears.

Example 6

Microstructured effect pigments according to Example 1 are admixed with a proportion of 0.1% by weight, based on the total amount, of the pigment powder to be protected (Colorstream® Viola Fantasy, silicon dioxide coated with titanium dioxide, tin oxide and zirconium oxide, Merck KGaA). In order to check the protected mixture, the powder is applied to a specimen slide and investigated by means of a microscope. Under the microscope, the characteristic structuring of the tracer is evident. The addition of the tracer does not result in a change in the applicational properties of the pigment powder to be protected.

The preceding examples can be repeated with similar success by substituting the generically or specifically described reactants and/or operating conditions of this invention for those used in the preceding examples.

The entire disclosures of all applications, patents and publications, cited herein and of corresponding German application No. 10357703.3, filed Dec. 9, 2003 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Colored flake-form effect pigments comprising one or more layers, where at least one of the layers comprises one or more colorants or is itself a colorant and at least one of the layers has a groove or grid structure, wherein the groove or grid structure has 250 nm to 2000 nm separations between adjacent grooves or grids.

2. Effect pigments according to claim 1, which comprise a substrate layer that comprise one or more colorants or is itself a colorant and has a groove or grid structure.

3. Effect pigments according to claim 2, wherein a substrate layer comprises one or more metal oxides, metal oxide hydrates, metal suboxides, metal fluorides, metal nitrides, metal oxynitrides, metal phosphates or a mixture thereof.

4. Effect pigments according to claim 3, wherein a substrate layer comprises aluminum oxide, titanium dioxide, titanium suboxide, titanium oxynitride, silicon dioxide, zirconium oxide, iron oxide, ilmenite, pseudobrookite, chromium oxide, cobalt oxide and/or vanadium oxide.

5. Effect pigments according to claim 1, wherein a substrate layer is coated with one or more transparent, semitransparent and/or opaque layers of metal oxides, metal oxide hydrates, metal suboxides, metals, metal fluorides, metal nitrides, metal oxynitrides, metal phosphates or a mixture thereof.

6. Effect pigments according to claim 1, which comprise a colorless substrate layer comprising no colorants and having a groove or grid structure and to which one or more layers have been applied on at least one side, where at least one of the layers comprises one or more colorants or is itself a colorant.

7. Effect pigments according to claim 6, wherein the colorless substrate layer comprising no colorants comprises one or more metal fluorides, metal oxides, metal oxide hydrates, metal suboxides, metals, metal nitrides, metal oxynitrides, metal phosphates or a mixture thereof.

8. Effect pigments according to claim 6, wherein the colorless substrate layer comprising no colorants comprises magnesium fluoride, aluminum oxide, silicon dioxide, titanium dioxide, zirconium oxide, aluminum or a mixture thereof.

9. Effect pigments according to claim 6, wherein the one or more layers comprises one or more metal oxides, metal oxide hydrates, metal suboxides, metals, metal fluorides, metal nitrides, metal oxynitrides, metal phosphates or a mixture thereof.

10. Effect pigments according to claim 1, which comprise a colorless substrate layer comprising no colorants and having a groove or grid structure and to which one or more colorless layers or one or more layers comprising no colorants have optionally been applied to at least one side, and which is encased with a polymer layer comprising one or more colorants.

11. Effect pigments according to claim 10, wherein the colorless substrate layer comprising no colorants comprises one or more metal fluorides, metal oxides, metal oxide hydrates, metal suboxides, metals, metal nitrides, metal oxynitrides, metal phosphates or a mixture thereof.

12. Effect pigments according to claim 10, wherein the colorless substrate layer comprising no colorants comprises magnesium fluoride, aluminum oxide, silicon dioxide, titanium dioxide, zirconium oxide, aluminum or a mixture thereof.

13. Effect pigments according to claim 10, wherein the one or more colorless layers or one or more layers comprising no colorants comprise one or more metal oxides, metal oxide hydrates, metal suboxides, metals, metal fluorides, metal nitrides, metal oxynitrides, metal phosphates or a mixture thereof.

14. Colored flake-form effect pigments comprising one or more layers, where at least one of the layers comprises one or more colorants or is itself a colorant and at least one of the layers has a groove or grid structure, which comprise a colorless substrate layer comprising no colorants and having a groove or grid structure and to which one or more colorless layers or layers comprising no colorants have optionally been applied to at least one side, and which is encased with a polymer layer comprising one or more colorants, wherein the polymer is a crosslinked melamine-formaldehyde resin or a crosslinked polystyrene.

15. Effect pigments according to claim 1, wherein the one or more colorants are one or more inorganic or organic dyes and/or pigments or luminescent colorants.

16. Effect pigments according to claim 14, wherein the groove or grid structure has 250 nm to 2000 nm separations between adjacent grooves or grids.

17. Effect pigments according to claim 1, wherein the groove or grid structure is formed by arranged lines, hemispheres, spheres, pyramids, cubes or correspondingly shaped holes.

18. A process for preparing colored flake-form effect pigments according to claim 1, comprising a) providing a body with a groove or grid structure, which may be applied to a support, b) coating the body with one or more layers, where at least one of the layers comprises one or more colorants or is itself a colorant, and c) detaching the one or more layers from the body or separating the one or more layers from the support together with the body.

19. A process according to claim 18, wherein the body provided with a groove or grid structure is coated with a substrate layer comprising one or more colorants or with a colored substrate layer, and wherein the substrate layer is detached from the body.

20. A process according to claim 19, further comprising coating the substrate layer with one or more transparent, semitransparent and/or opaque layers of one or more metal oxides, metal oxide hydrates, metal suboxides, metals, metal fluorides, metal nitrides, metal oxynitrides, metal phosphates or a mixture thereof.

21. A process according to claim 18, wherein the body provided with a groove or grid structure is coated with a colorless substrate layer or a substrate layer comprising no colorant, onto which one or more layers are applied, where at least one of the layers comprises one or more colorants or is itself a colorant, and wherein the substrate layer is detached from the body.

22. A process for preparing colored flake-form effect pigments according to claim 1, comprising a) providing a body with a groove or grid structure which is coated with a colorless substrate layer or a substrate layer comprising no colorant, b) detaching the substrate layer from the body, and c) then applying one or more layers to the detached substrate layer, where at least one of the one or more layers comprises one or more colorants or is itself a colorant.

23. A process for preparing colored flake-form effect pigments according to claim 1, comprising a) providing a body with a groove or grid structure which is coated with a colorless substrate layer or a substrate layer comprising no colorant, b) detaching the substrate layer from the body, and c) then optionally applying one or more colorless layers or layers comprising no colorants to the detached substrate layer, and d) then a polymer layer comprising one or more colorants is applied.

24. A process for preparing colored flake-form effect pigments comprising one or more layers, where at least one of the layers comprises one or more colorants or is itself a colorant and at least one of the layers has a groove or grid structure, comprising a) providing a body with a groove or grid structure which is coated with a colorless substrate layer or a substrate layer comprising no colorant, b) detaching the substrate layer from the body, and c) then optionally applying one or more colorless layers or layers comprising no colorants to the detached substrate layer, and d) then a polymer layer comprising one or more colorants is applied, wherein the polymer layer is formed by depositing crosslinking melamine-formaldehyde resins on the one or more layers, followed by curing or crosslinking of the melamine-formaldehyde resins.

25. A process according to claim 18, wherein the body with a grid structure has arranged lines, hemispheres, pyramids, cubes or spheres.

26. A process according to claim 19, wherein the coating with a substrate layer or the coating with one or more layers is carried out wet-chemically, by a sol-gel process or via a PVD and/or CVD process.

27. A cosmetic composition, surface coating, paint, plastic article, film, pigment composition, dry preparation, a security application, a tracer, a laser marking, a coloring seed, a food coloring, or a medicament coating, comprising effect pigments according to claim 1.

28. A process for preparing colored flake-form effect pigments comprising one or more layers, where at least one of the layers comprises one or more colorants or is itself a colorant and at least one of the layers has a groove or grid structure, comprising a) providing a body with a groove or grid structure, which may be applied to a support, b) coating the body with one or more layers, where at least one of the layers comprises one or more colorants or is itself a colorant, and c) detaching the one or more layers from the body or separating the one or more layers from the support together with the body, wherein the groove or grid structure has 250 nm to 200 nm separations between adjacent grooves or grids.

* * * * *